United States Patent [19]

Kawaguchi et al.

[11] Patent Number: 5,443,280
[45] Date of Patent: Aug. 22, 1995

[54] UNDERBODY STRUCTURE

[75] Inventors: Masakiyo Kawaguchi, Aichi; Keiichi Yoneda, Nagoya; Naoto Hirasaka, Susono; Akira Akiyama, Nagoya, all of Japan

[73] Assignee: Toyota Jidosha Kabushiki Kaisha, Toyota, Japan

[21] Appl. No.: 157,287

[22] Filed: Nov. 26, 1993

[30] Foreign Application Priority Data

Nov. 26, 1992 [JP] Japan .................. 4-317067

[51] Int. Cl.⁶ .............................................. B60G 7/00
[52] U.S. Cl. .................... 280/660; 280/688; 280/716
[58] Field of Search ............... 280/93, 96.1, 660, 662, 280/666, 671, 701, 716, 788

[56] References Cited

U.S. PATENT DOCUMENTS

| | | | |
|---|---|---|---|
| 4,097,057 | 6/1978 | Goodrich, Jr. et al. | 280/662 |
| 4,257,623 | 3/1981 | Kawase et al. | 208/660 |
| 4,720,120 | 1/1988 | Shimatani et al. | 280/716 |
| 5,183,286 | 2/1993 | Ayabe | 280/719 |

FOREIGN PATENT DOCUMENTS 3-1290 1/1991 Japan .
3-26677 3/1991 Japan .

Primary Examiner—Kenneth R. Rice
Attorney, Agent, or Firm—Cushman, Darby & Cushman

[57] ABSTRACT

An intermediate portion of a cylindrical suspension member collar extending in a longitudinal direction of a vehicle body is welded to an end portion of a suspension member in a transverse direction of the vehicle body. Both longitudinal-direction end portions of the suspension member collar are reduced in diameter in comparison with the intermediate portion thereof. The suspension member collar is disposed between respective inner cylinder portions of a pair of mounts so as to be coaxial with the inner cylinder portions. A shaft member is inserted into the inner cylinder portion of the mount and the suspension member collar, and a rubber bushing is disposed between an outer cylinder portion of the mount and the inner cylinder portion thereof, so that the outer cylinder portion and the inner cylinder portion can rotate relatively to each other. This makes it possible to prevent the rotation of the side member about an axial center thereof.

17 Claims, 16 Drawing Sheets

UNDERBODY STRUCTURE

BACKGROUND OF THE INVENTION

1. Field of the Invention

The present invention relates to an underbody structure of a vehicle body, and particularly to an underbody structure, which has a mounting portion of a suspension member and a side member, of a vehicle body.

2. Description of the Related Art

Generally, input force applied from a road surface to a tire is transmitted via a suspension to a vehicle body. In particular, when a vehicle is running on a rough surface road, input force applied to a tire increases. Therefore, vibration of the body increases, and road noise is generated.

On the other hand, in order to reduce road noise, it is necessary only to cut off input force applied from a road surface. However, in this case, control stability of the body deteriorates. Further, it is also possible to contemplate providing a sound insulation material in a portion of the body producing a sound, or increasing the rigidity of a body input portion of a suspension. One example in which an improvement of this rigidity is achieved is disclosed in Japanese Utility Model Application Laid-Open No. 3-26677 (1991).

As illustrated in FIG. 16, the underbody structure 170 is constructed in that a reinforcing gusset 174 is fixed to the inside of a wheel house inner 172 in the transverse direction of the vehicle body and a lower end of the reinforcing gusset 174 is disposed in and fixed to a rear floor side member 176. A cross member 178 is horizontally disposed in and fixed to a region within the rear floor side member 176, in which the reinforcing gusset 174 is to be disposed. A rear suspension member 180 is fixed to a bottom surface of respective regions within the left-side and right-side rear floor side members 176. Accordingly, since input force applied from the rear suspension member 180 can be transmitted via the reinforcing gusset 174 to the wheel house inner 172, the mounting rigidity of the rear suspension member 180 can be improved. Further, since the regions within the left-side and right-side rear floor side members 176, at which the reinforcing gusset 174 is disposed and fixed to the respective rear floor side members 176, interconnect via the cross member 178 and the rear suspension member 180, the rigidity of the body input portion of a suspension can be increased.

However, in the above-described underbody structure 170, a mounting point S of the rear suspension member 180 is located on a main axis H passing through an axial center Q of the rear side member 176, and the mounting point S is offset downwardly with respect to the axial center Q of the rear side member 176 by a dimension Lz. Accordingly, among input force Fy, which generates From the mounting point S of the rear suspension member 180 and acts inwardly in a horizontal direction of the vehicle body, and input force Fz, which acts downwardly in a vertical direction of the vehicle body, the influence of moment FyLz about the axial center Q of the rear side member 176 which is caused by the input force Fy increases. The rotational motion of the rear side member 176 about the axial center Q causes, as shown by an imaginary line in FIG. 16, the cross member 178 to bend upward and the floor pan 182 to be vibrated, thereby resulting in that road noise is produced.

SUMMARY OF THE INVENTION

In view of the above-described facts, an object of the present invention is to provide an underbody structure, which is capable of preventing a rotational motion of a side member about an axial center thereof.

An underbody structure according to one aspect of the present invention is characterized in that a suspension member is supported on a side member by means of a shaft member having one axis parallel to a longitudinal direction of a vehicle body so as to be rotatable about the axis of the shaft member.

Further, an underbody structure according to a second aspect of the present invention is characterized in that, in accordance with claim 1, a mount having a uniform spring constant in a circumferential direction of the shaft member is disposed at a mounting portion of the shaft member.

Further, an underbody structure according to a third aspect of the present invention is characterized in that, in accordance with claim 1, the shaft member comprises a small diameter portion disposed just under a cross member and connected directly to the suspension member, and a large diameter portion disposed at each of both ends of the small diameter portion in an axial direction thereof and being rotatable about the axis of the shaft member with respect to the small diameter portion, a portion of the large diameter portion being connected to the side member.

In the underbody structure according to the present invention, even though moment about a rotation axis along the longitudinal direction of the vehicle body is applied to a mounting portion of the suspension member to the side member, the suspension member rotates about the axis of the shaft member having one axis parallel to the longitudinal direction of the vehicle body, thereby causing angular variation of the suspension member with respect to the side member to be absorbed. This makes it possible to prevent the transmission of the moment to the side member, and the rotational motion of the side member about an axial center thereof.

Further, in the underbody structure according to the second aspect of the present invention, since the mount having a uniform spring constant in the circumferential direction of the shaft member is disposed at the mounting portion of the shaft member, each spring constant has the same value with respect to a load acting on the suspension member, and irrespective off the angle, from a rear-side view of the vehicle, of a vector of force applied to the mount section, the target spring constant is obtained.

In addition, in the underbody structure according to the third aspect of the present invention, since the shaft member comprises the small diameter portion disposed just under the cross member and connected directly to the suspension member, and the large diameter portion disposed at each of both ends of the small diameter portion in the axial direction thereof so as to be rotatable about the axis of the shaft member with respect to the small diameter portion, a portion of the large diameter portion being connected to the side member, the shaft member does not interfere with the cross member and amount of offset between the axial center of the shaft member and a bottom surface of the floor side member can be reduced.

The underbody structure of the present invention, with the structure described above, obtains the excellent effects of being capable of absorbing angular variation of the suspension member at the mounting portion of the suspension member and the side member, and preventing the rotational motion of the side member about the axial center thereof.

DESCRIPTION OF THE PREFERRED EMBODIMENTS

Referring first to FIG. 1 through FIG. 5, a first embodiment of an underbody structure according to the present invention will be described. Note that arrows "FR", "IN", and "UP", shown in the accompanying drawings, respectively represent: the forward direction of a vehicle; an inward direction thereof relative to a transverse axis of the vehicle; and the upward direction thereof.

Figure 5:
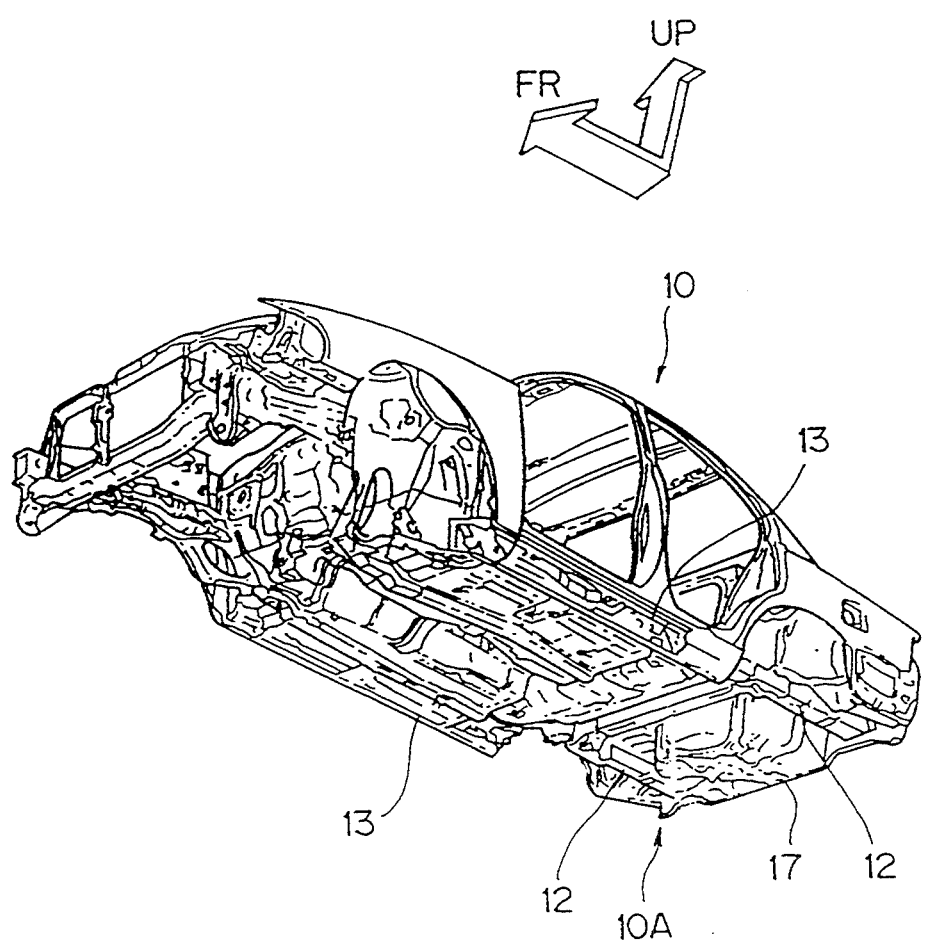
FIG. 5 is a perspective view, when seen diagonally from the front of the vehicle body, illustrating a lower part of a vehicle to which the underbody structure according to the first embodiment off the present invention is applied.

FIG. 5 illustrates a rear underbody 10A forming a rear-under section of a motor vehicle body 10, in which a pair of rear floor side members 12 is disposed in the vicinity of both transverse-direction end portions of the rear underbody 10A along a longitudinal direction of the vehicle body. A front-end portion of each of the pair of rear floor side members 12 is connected to a floor side inner member 13, and a rear end portion thereof is connected to a lower back panel 17.

Figure 2:
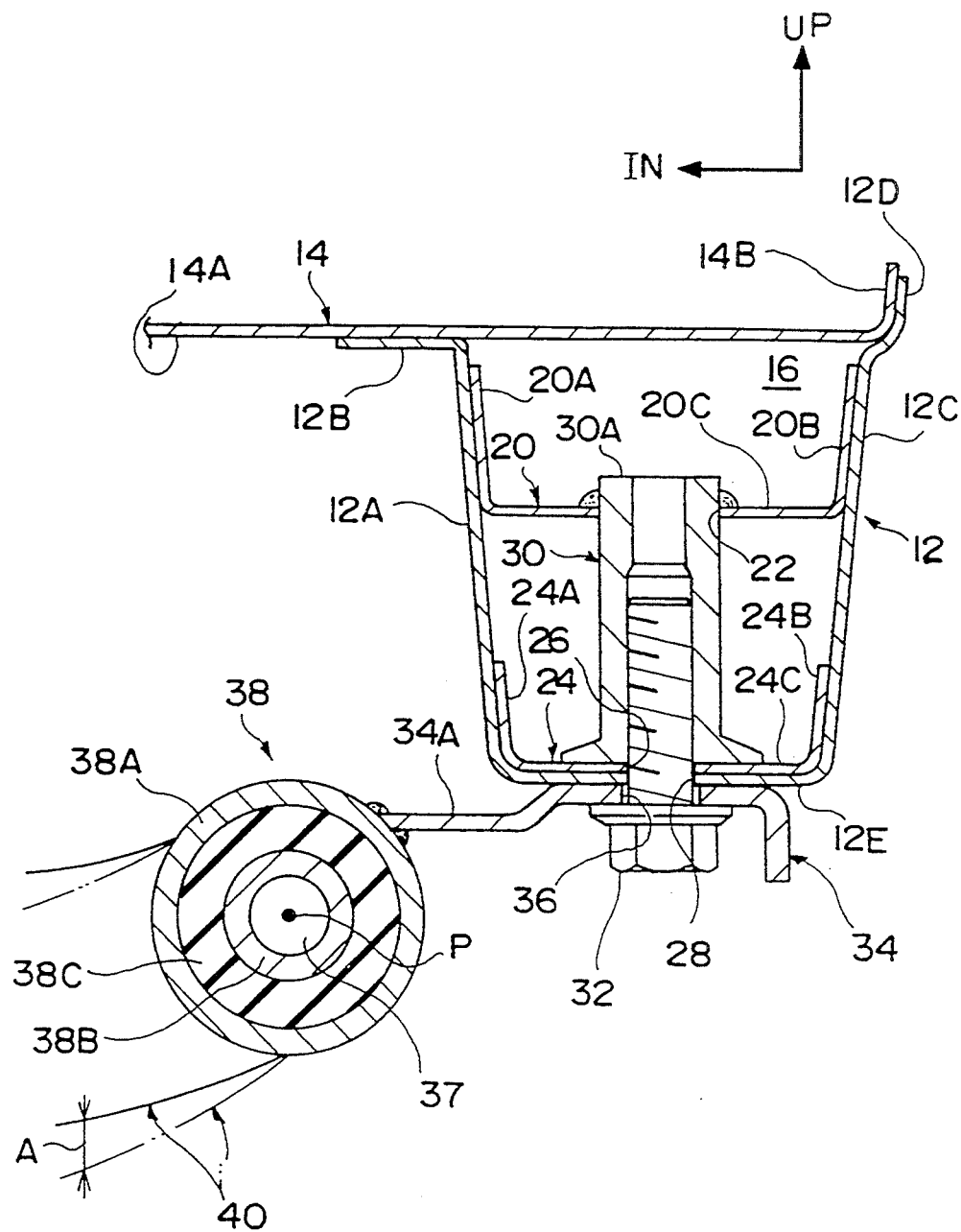
FIG. 2 is a cross-sectional view taken along lines 2—2 of FIG. 1.

As illustrated in FIG. 2, the rear floor side member 12 has a substantially U-shaped cross-sectional configuration when seen from the longitudinal direction of the vehicle body, with an opening thereof being oriented upward. An upper end portion of an inside wall portion 12A, in the transverse direction of the vehicle body, of the rear floor side member 12 is bent inward in the transverse direction of the vehicle body so that it is formed into a flange 12B. An upper end portion of an outside wall portion 12C, in the transverse direction of the vehicle body, of the rear floor side member 12 protrudes by one step toward the outer side in the transverse direction of the vehicle body and extends upward so that it is formed into a flange 12D. The flange 12B is welded to a lower surface 14A of a rear floor pan 14 in the vicinity of each of both end portions of the rear Floor pan 14 in the transverse direction of the vehicle body. The flange 12D is welded to a flange 14B of the rear Floor pan 14, which is formed so as to extend upward from the outer edge portion, in the transverse direction of the vehicle body, of the rear floor pan 14. Accordingly, the rear floor side member 12, together with the rear floor pan 14, forms an enclosed cross-sectional configuration 16 which extends in a longitudinal direction of the vehicle body.

An upper reinforcement 20 of the rear floor side member, which extends in a longitudinal direction of the vehicle body along the enclosed cross-sectional configuration 16, is disposed at an upper portion of the enclosed cross-sectional configuration 16. The upper reinforcement 20 of the rear floor side member has a substantially U-shaped cross-sectional configuration when seen from the longitudinal direction of the vehicle body and has an opening thereof oriented upward. An inside wall portion 20A, in the transverse direction of the vehicle body, of the upper reinforcement 20 is welded to an upper portion of the inside wall portion 12A, in the transverse direction of the vehicle body, of the rear floor side member 12. An outside wall portion 20B, in the transverse direction of the vehicle body, of the upper reinforcement 20 is welded to an upper portion of the outside wall portion 12C, in the transverse direction of the vehicle body, of the rear floor side member 12. Further, in the vicinities of both end portions, in the longitudinal direction of the vehicle body, off a base portion 20C of the upper reinforcement 20, through holes 22 are respectively formed.

A lower reinforcement 24 of the rear floor side member, which extends in the longitudinal direction of the vehicle body along a bottom wall portion 12E of the rear floor side member 12, is disposed at a lower portion of the enclosed cross-sectional configuration 16. The lower reinforcement 24 of the rear floor side member has a substantially U-shaped cross-sectional configuration when seen from the longitudinal direction of the vehicle body and has an opening thereof oriented upward. An inside wall portion 24A, in the transverse direction of the vehicle body, of the lower reinforcement 24 is welded to a lower portion of the inside wall portion 12A, in the transverse direction of the vehicle body, of the rear Floor side member 12. An outside wall portion 24B, in the transverse direction of the vehicle body, of the lower reinforcement 24 is welded to a lower portion of the outside wall portion 12C, in the transverse direction of the vehicle body, of the rear floor side member 12. Further, a base portion 24C of the lower reinforcement 24 is welded to the bottom wall portion 12E of the rear floor side member 12. The base portion 24C and the bottom wall portion 12E are provided with through holes 26, 28, respectively, so that the through holes 26, 28 are formed coaxially with the through hole 22.

A weld nut 30 is welded to the base portion 24C of the lower reinforcement 24 so as to be coaxial with the through hole 26. An tipper end portion 30A of the weld nut 30 is inserted into the through hole 22 and welded to an outer peripheral portion of the through hole 22.

A bolt 32 is threadedly engaged with the weld nut 30, with the bolt 32 being inserted from a lower side. The bolt 32 allows a body mount bracket 34 to be mounted to the bottom wall portion 12E of the rear floor side member 12.

Figure 1:
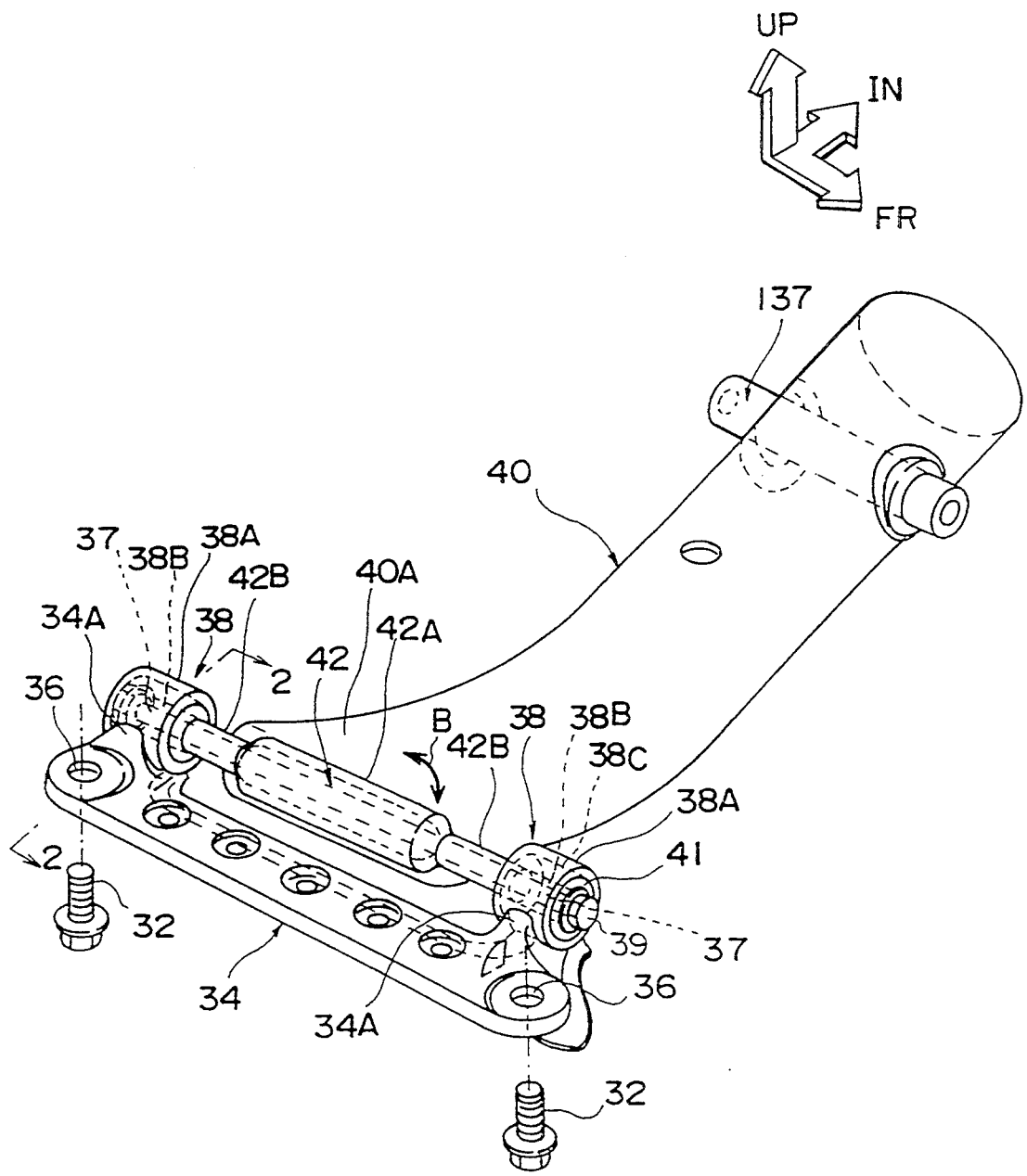
FIG. 1 is a perspective view, when seen diagonally from the outside of a front vehicle body, illustrating an underbody structure according to a first embodiment of the present invention.

As illustrated in FIG. 1, the body mount bracket 34 has an elongated configuration which extends in the longitudinal direction of the vehicle body. At both end portions of the body mount bracket 34 in a longitudinal direction thereof, there are formed body-mounting holes 36. Each bolt 32 is inserted from a lower side into each body-mounting hole 36.

At both end portions, in the longitudinal direction of the vehicle body, of the body mount bracket 34, extended portions 34A are formed so as to extend toward an inner side in the transverse direction of the vehicle body. At each of both end portions at inner sides, in the transverse direction of the vehicle body, of the extended portions 34A, a cylindrical body mount 38 is disposed such that an axial center thereof is oriented toward the longitudinal direction of the vehicle body. Accordingly, the body mount 38 is positioned at the inner side of the rear floor side member 12 in the transverse direction of the vehicle body.

As illustrated in FIG. 2, the body mount 38 is comprised of an outer cylinder portion 38A, an inner cylinder portion 38B, and a cushion rubber 38C disposed between the outer cylinder portion 38A and the inner cylinder portion 38B. The outer cylinder portion 38A is welded to the extended portion 34A of the body mount bracket 34.

FIG. 1, illustrates that a suspension member 40 has a cylindrical shape and the end portion 40A thereof in the transverse direction of the vehicle body is elongated in the longitudinal direction of the vehicle body. A lower arm 137 is mounted to an intermediate portion of the suspension member 40. An intermediate portion 42A of a cylindrical suspension member collar 42 whose longitudinal direction extends in the longitudinal direction of the vehicle body is welded to the transverse-direction end portion 40A of the suspension member 40. Further, both longitudinal-direction end portions 42B of the suspension member collar 42 are respectively smaller in diameter than the intermediate portion 42A, and the suspension member collar 42 is disposed between the respective inner cylinder portions 38B of the pair of the body mounts 38 so as to be coaxial with the inner cylinder portions 38B. In addition, a shaft member 37 is inserted into the inner cylinder portions 38B of the body mounts 38 and the suspension member collar 42, and an end portion of the shaft member 37, which projects from the inner cylinder portion 38B of one of the pair of body mounts 38, threadedly engages a nut 39. Meanwhile, a stopper 41 is inserted between a head portion off the shaft member 37 and the body mount 38, and the nut 39 and the body mount 38, respectively.

Next, operation off the present embodiment will be described below.

Although input force from a tire which vibrates during running on a rough surface road is imparted via the suspension member 40 to the body mount bracket 34, the underbody structure of the present embodiment is constructed in that, as illustrated in FIG. 2, when the suspension member 40 swings in a vertical direction of the vehicle body (as indicated by arrow A in FIG. 2) about an axial center P of the shaft member 37, the suspension member collar 42 swings integratedly in the vertical direction of the vehicle body (as indicated by arrow B in FIG. 1) about the axial center P of the shaft member 37, and simultaneously, the inner cylinder portions 38B of the pair of body mounts 38 also swing integratedly in the vertical direction of the vehicle body (as indicated by arrow B in FIG. 1) about the axial center P of the shaft member 37.

However, the swing off the inner cylinder portion 38B of the body mount 38 is not transmitted to the outer cylinder portion 38A of the body mount 38 due to elastic deformation of the cushion rubber 38C. Accordingly, when the inner cylinder portion 38B of the body mount 38 rotates relatively with respect to the outer cylinder portion 38A about the axial center P of the shaft member 37, angular variation of the suspension member 40 with respect to the rear floor side member 12 is absorbed. As a result, moment is not transmitted to the rear floor side member 12.

Figure 3:
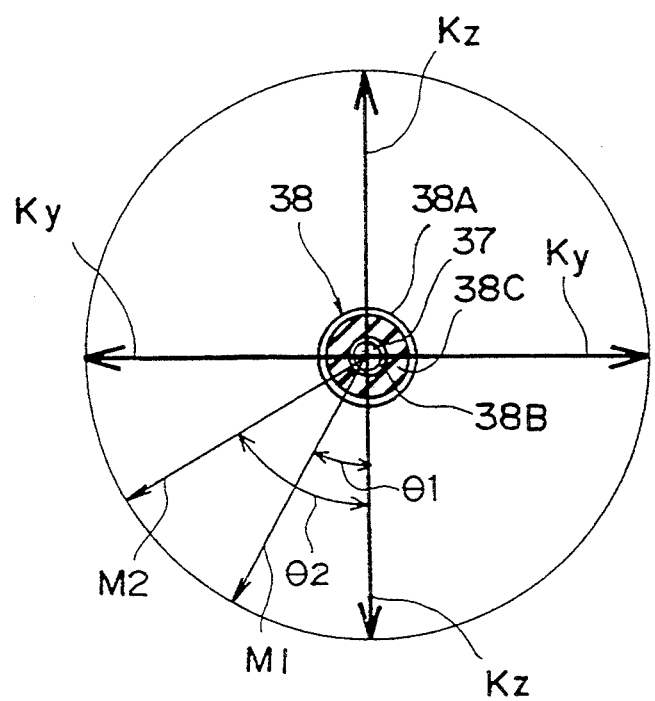
FIG. 3 is an operation schematic diagram of the underbody structure according to the first embodiment of the present invention.
Figure 4:
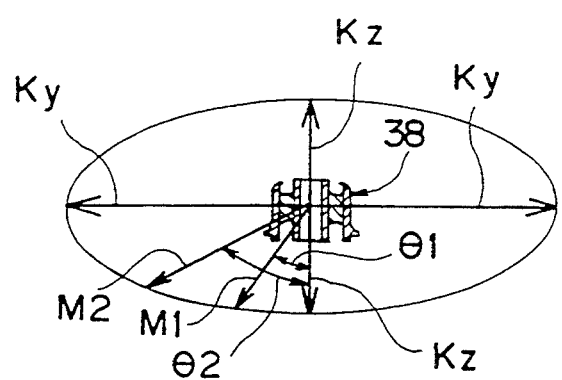
FIG. 4 is an operation schematic diagram of a conventional underbody structure.

Further, as illustrated in FIG. 3, in the present embodiment, the cushion rubber 38C of the body mount 38 which has a uniform spring constant in a circumferential direction of the shaft member 37 is disposed in a mounting portion for the shaft member 37. As a result, the respective spring constant, e.g., spring constant $K_z$ in upward and downward directions of the vehicle body, spring constant $K_y$ in left-side and right-side directions, and the like, are the same and, are independent of respective angles $\theta_1$, $\theta_2$, of vectors M1, M2 of Force applied to the mount section, a target spring constant with respect to force which acts on the body mount can be obtained. This allows target supporting rigidity to be improved. On the other hand, with a structure in which the axis of the body mount 38 is oriented to the vertical direction of the vehicle body as illustrated in FIG. 4, spring constant $K_z$ in the upward and downward directions of the vehicle body becomes smaller than spring constant $K_y$ in the left-side and right-side directions, and the difference of the respective angles $\theta_1$, $\theta_2$, of the vectors M1, M2 of force applied to the mount section causes great variations in spring constant $K_z$. Accordingly, target spring constant is difficult to obtain, target supporting rigidity is not obtained, and control stability of the vehicle body deteriorates.

Next, a second embodiment of an underbody structure according to the present invention will be described below with reference to FIG. 6 and FIG. 7. It should be noted that the same members as those of the first embodiment will be denoted by the same reference numerals, and a description thereof will be omitted.

Figure 6:
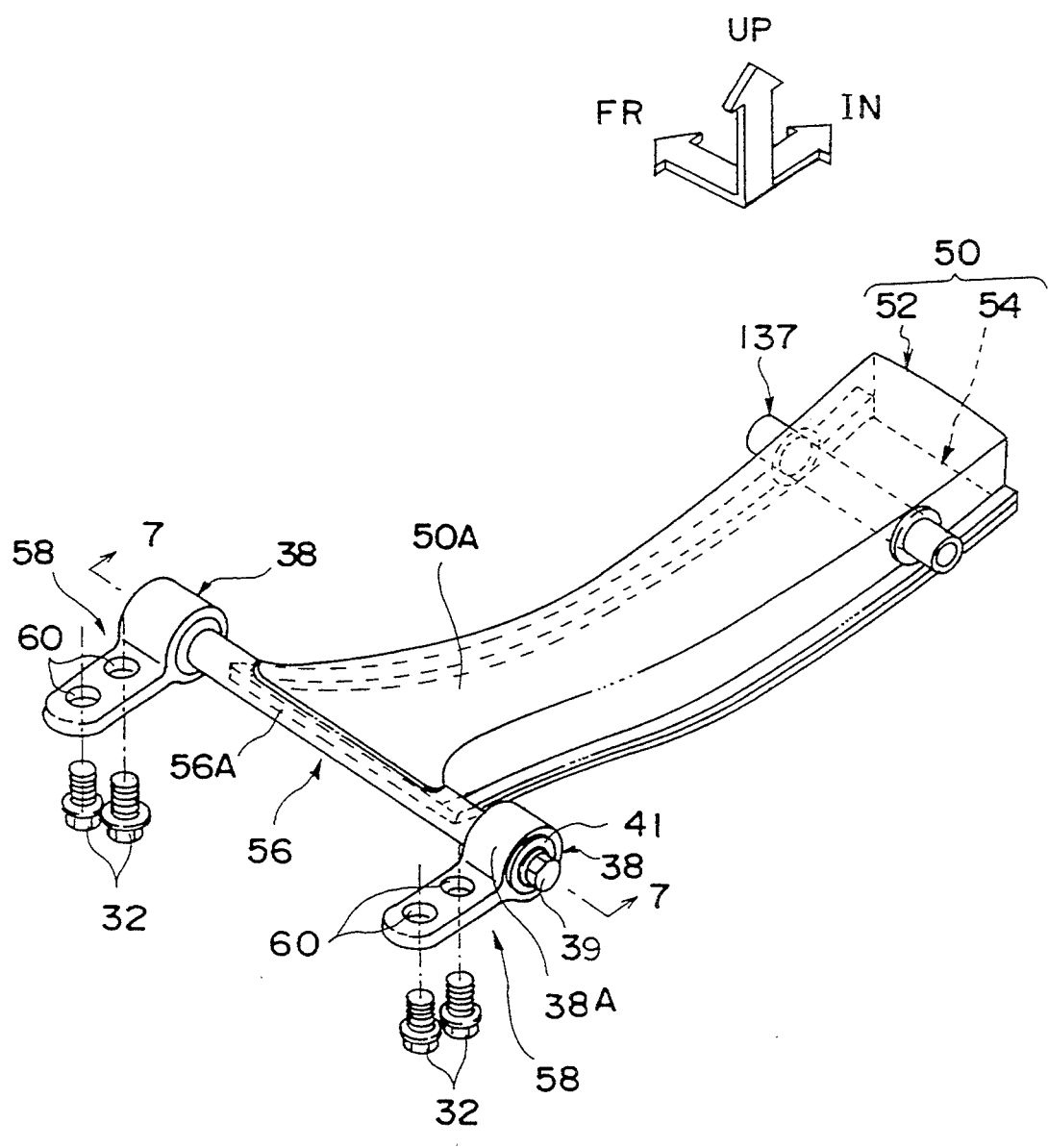
FIG. 6 is a perspective view, when seen diagonally from the outside of a rear vehicle body, illustrating an underbody structure according to a second embodiment of the present invention.

As illustrated in FIG. 6, in the second embodiment, a suspension member 50 is comprised of an upper suspension member 52 and an under suspension member 54 so as to form an enclosed cross-sectional configuration of a rectangular shape. The upper suspension member 52 has a hat-shaped cross-sectional configuration when seen from the transverse direction of the vehicle body, and has an opening thereof oriented downward. The under suspension member 54 has a hat-shaped cross-sectional configuration when seen from the transverse direction of the vehicle body, and has an opening thereof oriented upward. Further, at an outer end portion of the suspension member 50 in the transverse direction of the vehicle body, an intermediate portion 56A of a suspension member collar 56 and an outer peripheral portion of the suspension member collar 56 are fixed in a position on the same plane as the upper wall surface 50A at the transverse-direction outer end portion of the suspension member 50.

Figure 7:
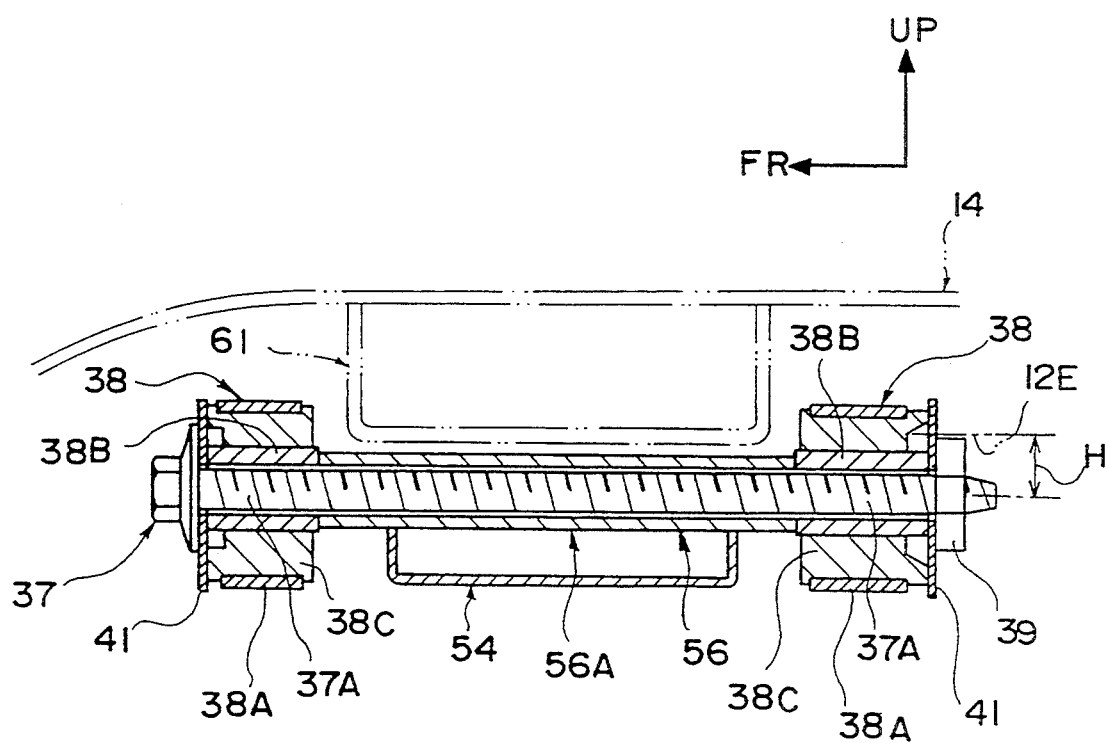
FIG. 7 is a cross-sectional view taken along lines 7—7 of FIG. 6.

As illustrated in FIG. 7, the body mounts 38 are disposed at both end portions of the suspension member collar 56 so as to be coaxial with the suspension member collar 56. The shaft member 37 is inserted from a front side of the vehicle body into the inner cylinder portion 38B of the body mount 38 and the suspension member collar 56.

Referring again to FIG. 6, a collar portion 58 is formed at the outer cylinder portion 38A of the body mount 38 and is provided with two through holes 60. Bolts 32 are inserted from a lower side into these through holes 60, so that the body mount 38 is mounted to the rear floor side member 12.

Accordingly, this embodiment obtains the same effects as those of the first embodiment, and simultaneously, is constructed such that the diameter of the suspension member collar 56 is made small in comparison with the first embodiment and the outer peripheral portion of the suspension member collar 56 is fixed in the position on the same plane as the upper wall surface 50A at the transverse-direction outer end portion of the suspension member 50. Accordingly, the suspension member collar 56 does not interfere with the cross member 61 and can be disposed just under the cross member 61 (see FIG. 7), thereby making it possible to reduce amount H of offset of the suspension member collar 56 with respect to the bottom wall portion 12E of the floor side member.

Next, a third embodiment of an underbody structure according to the present invention will be described below with reference to FIG. 8 and FIG. 9. It should be noted that the same members as those of the second embodiment will be denoted by the same reference numerals, and a description thereof will be omitted.

Figure 8:
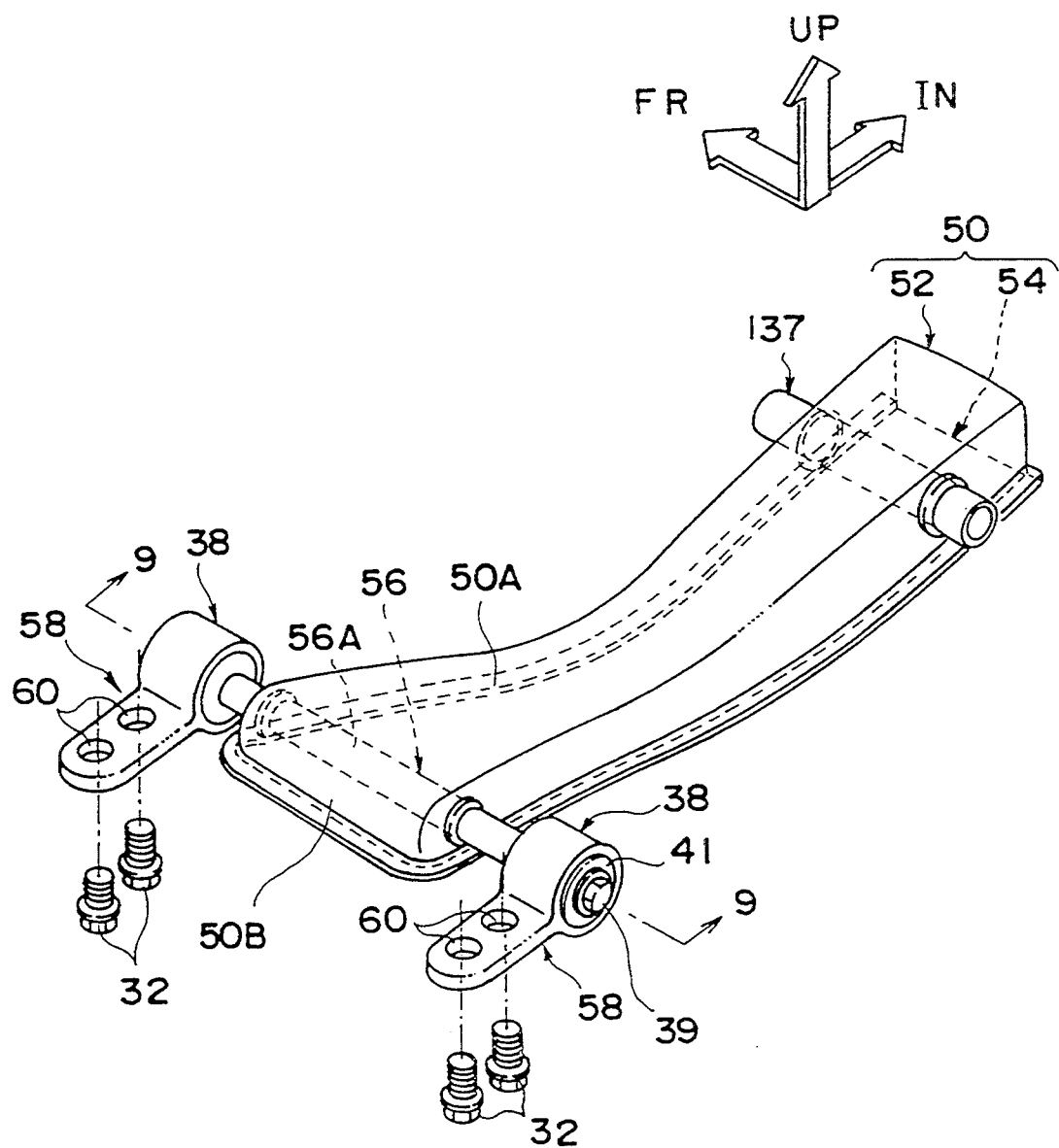
FIG. 8 is a perspective view, when seen diagonally from the outside of a rear vehicle body, illustrating an underbody structure according to a third embodiment of the present invention.

As illustrated in FIG. 8, the third embodiment is constructed in that a transverse-direction end portion of the suspension member 50 is blocked by a stand-up wall portion 50B and the intermediate portion 56A of the suspension member collar 56 passes through and is fixed to a proximal end of the upper suspension member 52 at the outer side in the transverse direction of the vehicle body.

Figure 9:
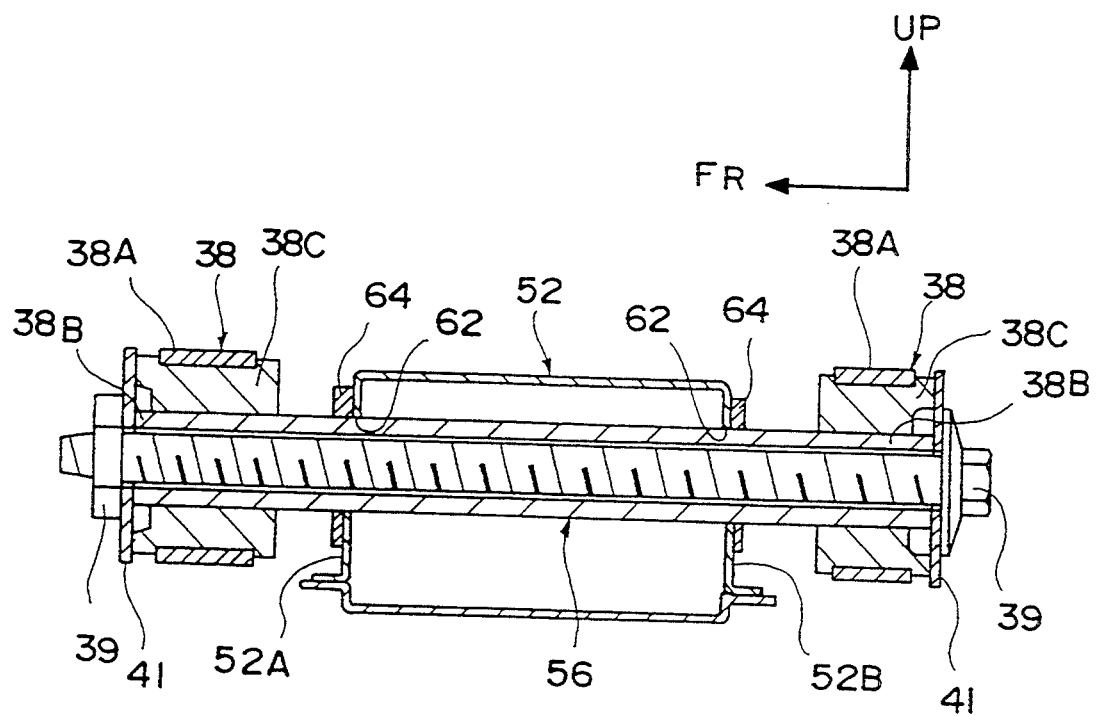
FIG. 9 is a cross-sectional view taken along lines 9—9 of FIG. 8.

Referring to FIG. 9, through holes 62, through which the suspension member collar 56 passes, are formed at a front-side wall portion 52A and a rear-side wall portion 52B of the upper suspension member 52. Collars 64 which are coaxial with the through holes 62 are respectively fixed to the respective outside surfaces of the front-side wall portion 52A and the rear-side wall portion 52B.

Accordingly, this embodiment obtains the same effects as those of the first embodiment, and simultaneously, can improve strength of a connecting portion between the suspension member 50 and the suspension member collar 56 by means of the collar 64.

Figure 10:
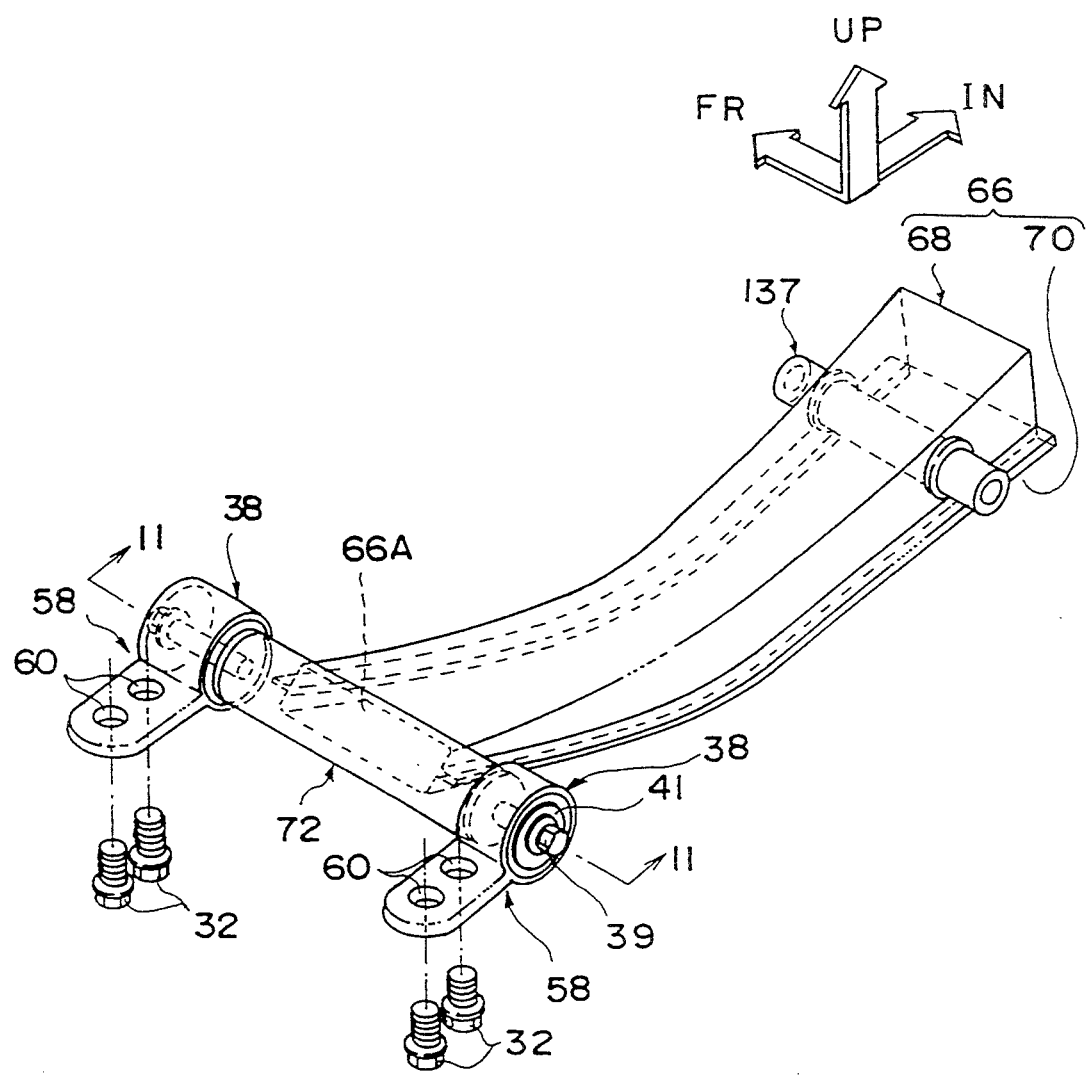
FIG. 10 is a perspective view, when seen diagonally from the outside of a rear vehicle body, illustrating an underbody structure according to a fourth embodiment of the present invention.

Next, a fourth embodiment of an underbody structure according to the present invention will be described below with reference to FIG. 10 and FIG. 11. It should be noted that the same members as those of the second embodiment will be denoted by the same reference numerals, and a description thereof will be omitted.

In the Fourth embodiment, the suspension member 66 forms an enclosed cross-sectional configuration by an upper suspension member 68 and an under suspension member 70. The upper suspension member 68 has a hat-shaped cross-sectional configuration when seen from the transverse direction of the vehicle body, and has an opening thereof oriented downward. The under suspension member 70 has a hat-shaped cross-sectional configuration when seen from the transverse direction of the vehicle body, and has an opening thereof oriented upward. An outer peripheral portion of the suspension member collar 72 with an axis thereof being oriented to the longitudinal direction of the vehicle body, is fixed to an open end portion 66A of the suspension member 66 at an outer side in the transverse direction of the vehicle body.

Figure 11:
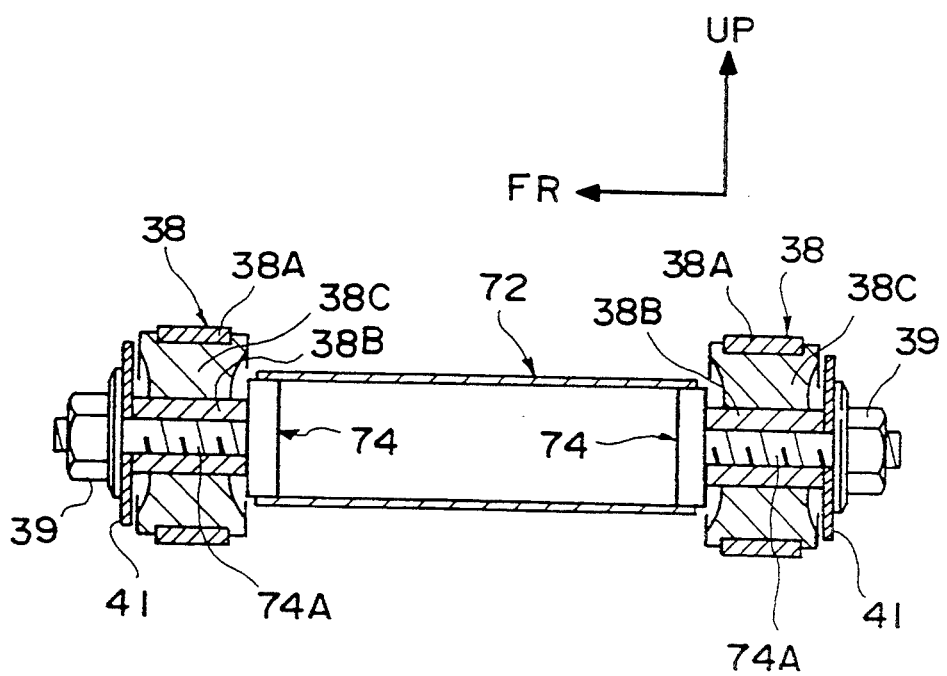
FIG. 11 is a cross-sectional view taken along lines 11—11 of FIG. 10.

Referring to FIG. 11, bolts 74, which serve as shaft members, are fixed to respective opening portions of both ends of the suspension member collar 72 such that respective threaded portions 74A are oriented toward outer sides in an axial direction of the suspension member collar 72. At each of threaded portions 74A of the bolts 74, the body mount 38 is fixed by the nut 39.

Accordingly, this embodiment obtains the same effects as those of the first embodiment, and simultaneously, since the shaft member 37 is not used, the weight of the body can be reduced in comparison with the third embodiment.

Next, a fifth embodiment of an underbody structure according to the present invention will be described below with reference to FIG. 12 and FIG. 13. It should be noted that the same members as those of the first and fourth embodiments will be denoted by the same reference numerals, and a description thereof will be omitted.

Figure 12:
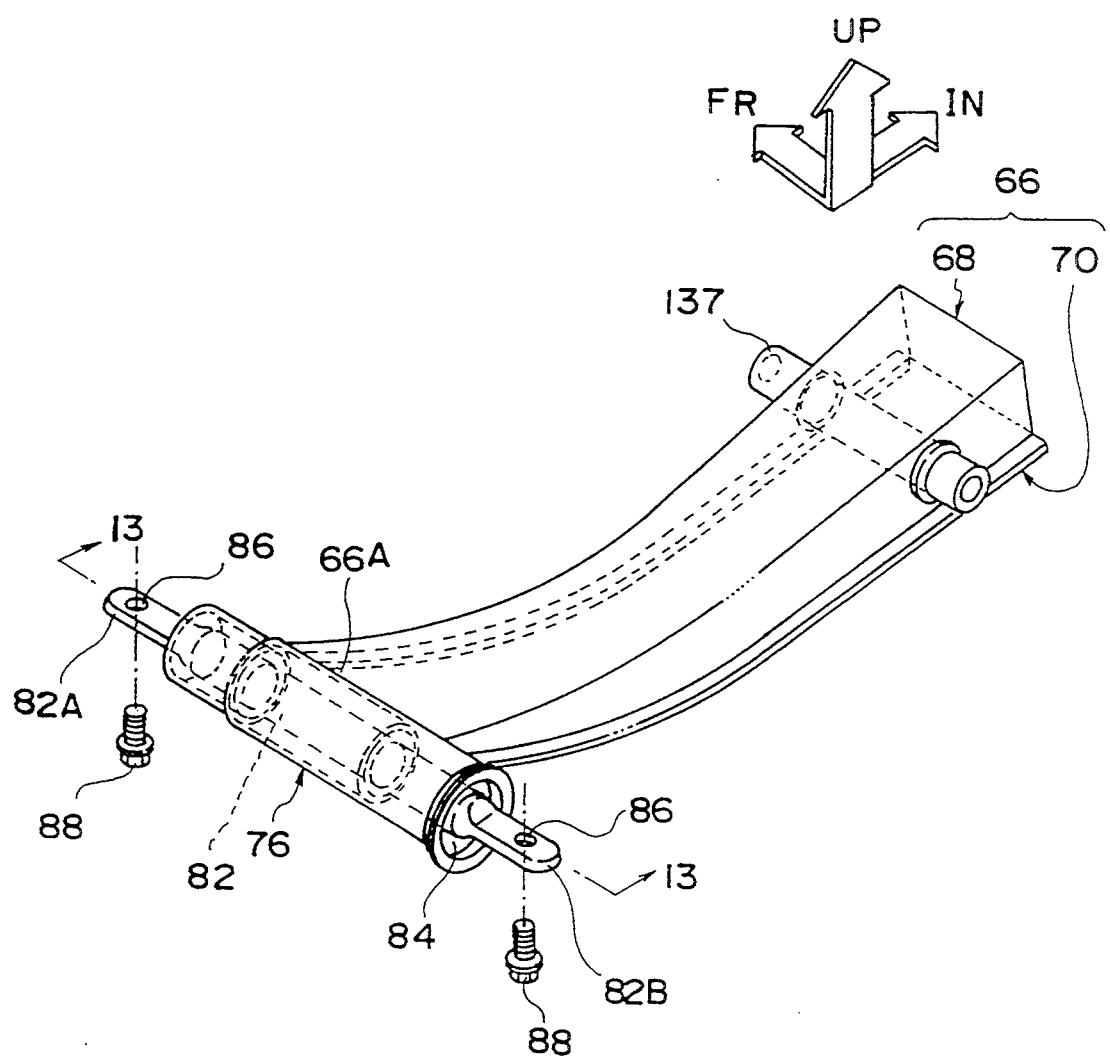
FIG. 12 is a perspective view, when seen diagonally from the outside of a rear vehicle body, illustrating an underbody structure according to a fifth embodiment of the present invention.

As illustrated in FIG. 12, the fifth embodiment is constructed in that an outer peripheral portion of a suspension member collar 76 with an axis thereof being oriented to the longitudinal direction of the vehicle body is fixed to the end portion 66A, at an outer side in the transverse direction of the vehicle body, of the suspension member 66.

Figure 13:
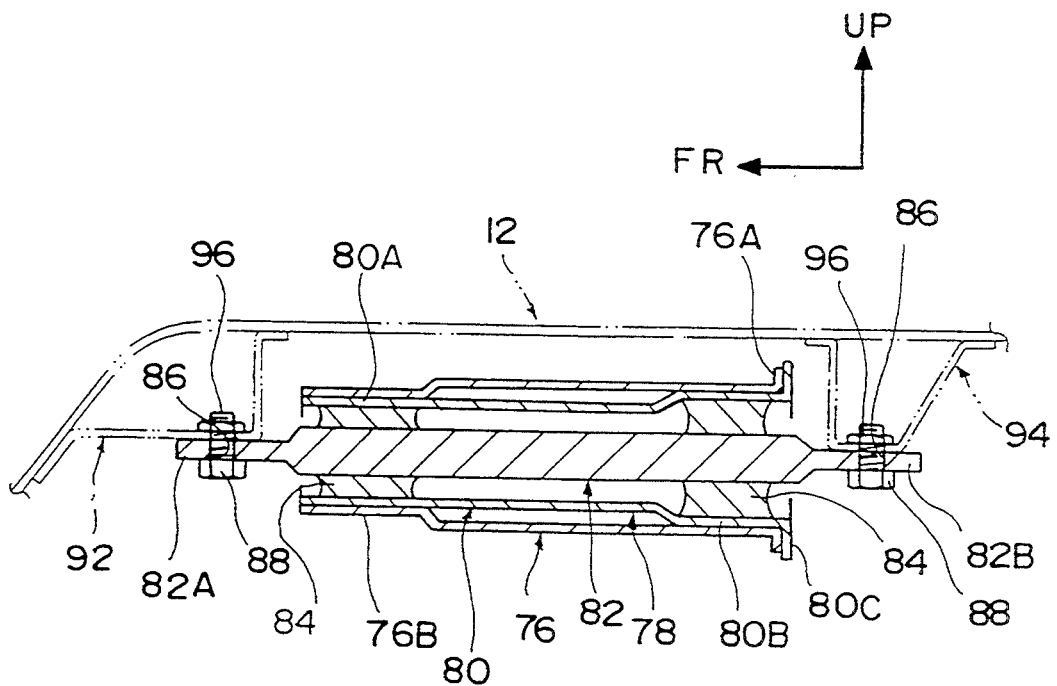
FIG. 13 is a cross-sectional view taken along lines 13—13 of FIG. 12.

Referring to FIG. 13, the suspension member collar 76 is formed such that a flange 76A is oriented toward the outer periphery of the suspension member collar 76 at the rear-side end portion thereof in the longitudinal direction of the vehicle body, and a proximal end portion thereof at the front side of the vehicle body is reduced in the diameter so as to form a small diameter portion 76B. A body mount 78 is inserted into the suspension member collar 76. An outer peripheral portion of a proximal front-side end portion 80A of an outer cylinder portion 80 of the body mount 78 is fixed to an inner peripheral portion of the small diameter portion 76B of the suspension member collar 76. A proximal rear-side end portion of the outer cylinder portion 80 of the body mount 78 is enlarged in the diameter so as to form a large diameter portion 80B, and is fixed to an inner peripheral portion of the rear-side end portion of the suspension member collar 76. Further, a flange 80C is formed so as to be oriented toward the outer periphery of the outer cylinder portion 80 at the rear-side end of the outer cylinder portion 80 of the body mount 78 and is fixed to the flange 76A of the suspension member collar 76.

A shaft member 82 is inserted in an axial position of the outer cylinder portion 80 of the body mount 78. Rubber bushings 84 are disposed between the shaft member 82 and the inner peripheral portion of the outer cylinder portion 80 of the body mount 78 in the vicinities of front-side and rear-side end portions of the outer cylinder portion 80. Further, both end portions of the shaft member 82 are each formed into flat plates. At each substantially central portion of these end portions 82A, 82B, a through hole 86 is formed by punching therein. A bolt 88 is inserted from a lower side into each of through holes 86. These bolts 88 threadedly engage with weld nuts 96 which are respectively fixed to brackets 92, 94 both of which are fixed to the lower part of the rear side member 12.

Accordingly, this embodiment obtains the same effects as those of the First embodiment, and simultaneously, can reduce the number of vehicle parts in comparison with the aforementioned embodiments.

Next, a sixth embodiment of an underbody structure according to the present invention will be described below with reference to FIG. 14 and FIG. 15. It should be noted that the same members as those of the first and fifth embodiments will be denoted by the same reference numerals, and a description thereof will be omitted.

Figure 14:
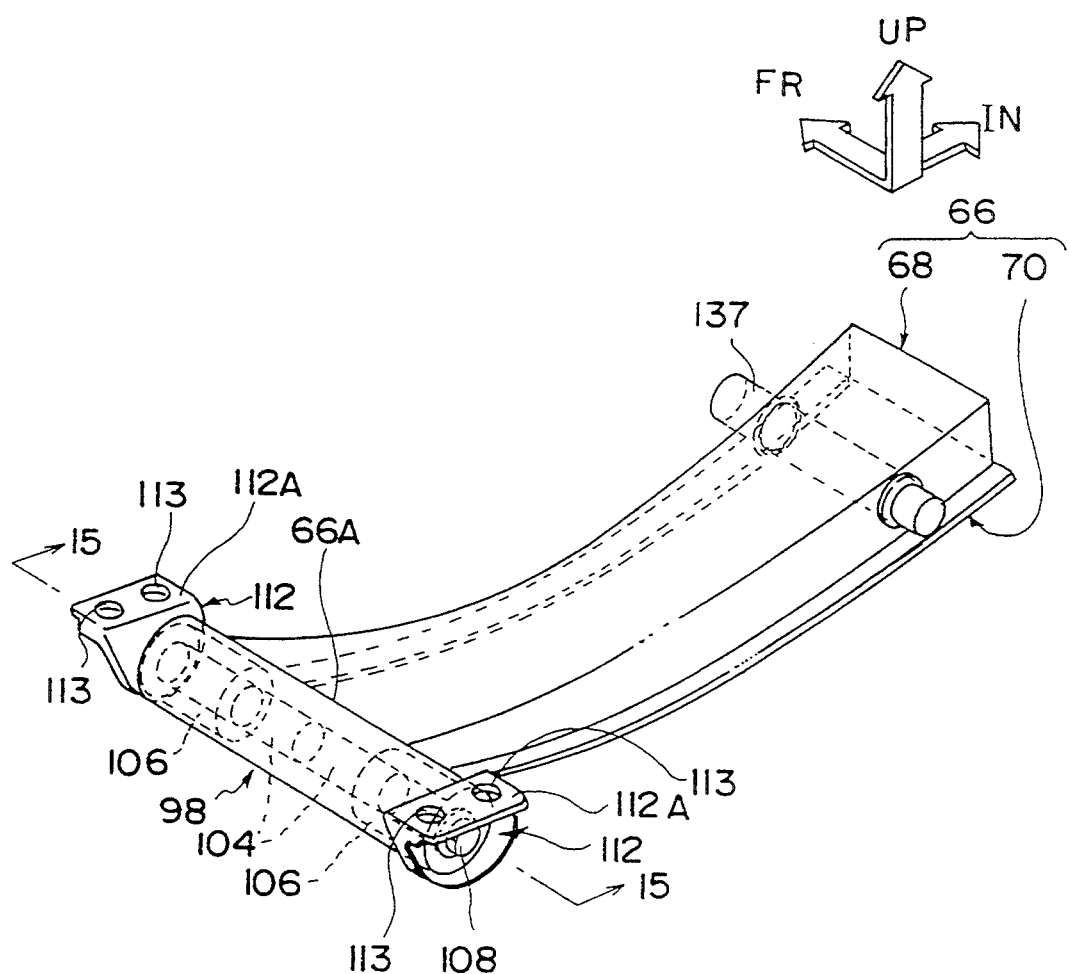
FIG. 14 is a perspective view, when seen diagonally From the outside of a rear vehicle body, illustrating an underbody structure according to a sixth embodiment of the present invention.

As illustrated in FIG. 14, the sixth embodiment is constructed in that an outer peripheral portion of a suspension member collar 98 with an axis thereof being oriented to the longitudinal direction of the vehicle body is fixed to the end portion 66A, at an outer side in the transverse direction of the vehicle body, of the suspension member 66.

Figure 15:
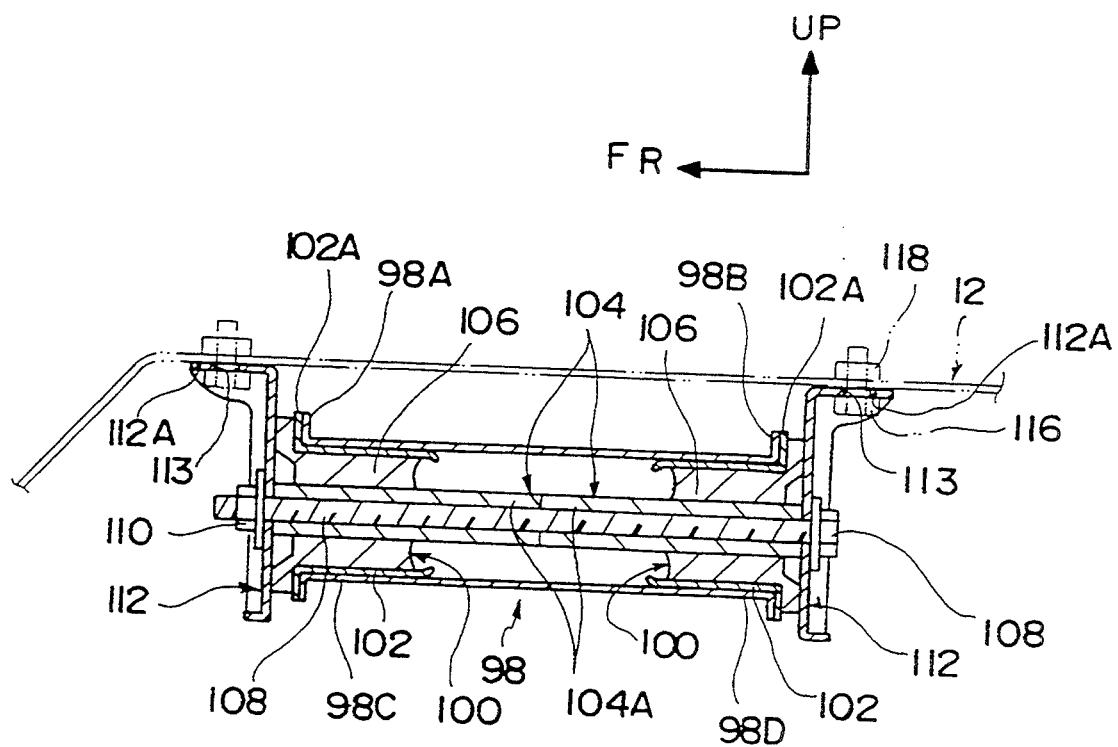
FIG. 15 is a cross-sectional view taken along lines 15—15 of FIG. 14.
Figure 16:
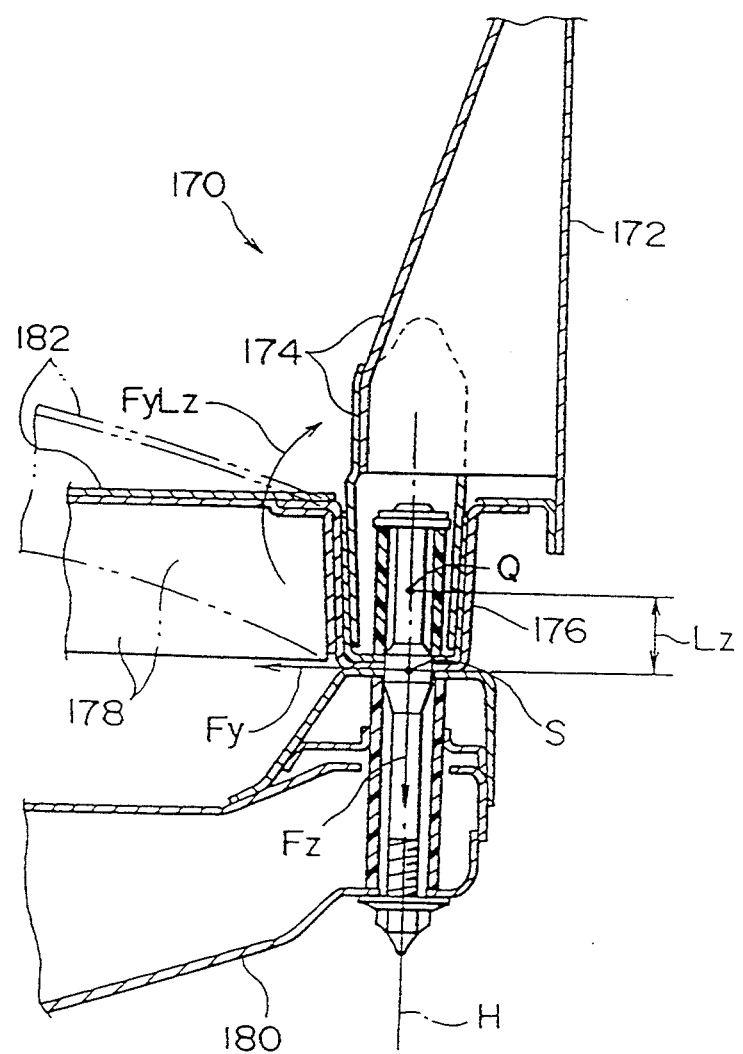
FIG. 16 is a cross-sectional view, when seen from the front of the vehicle body, illustrating a conventional rear underbody structure.

Referring to FIG. 15, a suspension member collar 98 is formed such that flanges 98A, 98B are formed so as to be oriented toward the side of an outer periphery of the suspension member collar 98 at both ends of the suspension member collar 98 in the longitudinal direction of the vehicle body. A body mount 100 is inserted into each of both end portions 98C, 98D, in the longitudinal direction of the vehicle body, of the suspension member collar 98. An outer cylinder portion 102 of the body mount 100 is fixed to an inner peripheral portion of the suspension member collar 98. Further, a flange 102A is formed so as to be oriented toward the side of the outer periphery of the outer cylinder portion 102 at one of end portions of the outer cylinder portion 102 of the body mount 100. The flange 102A is fixed to each of flanges 98A, 98B of the suspension member collar 98.

Two body mounts 100 are respectively inserted from a front side and a rear side of the vehicle body into the suspension member collar 98, and the respective inner cylinder portions 104 of these two body mounts 100 are adapted such that the respective leading end portions 104A thereof are brought into contact with each other. Rubber bushings 106 are disposed in the two body mounts 100 between the inner cylinder portion 104 and the outer cylinder portion 102. Further, a shaft member 108 is inserted into the inner cylinder portion 104 of the body mount 100 and is mounted to a pair of brackets 112 by respective nuts 110 so as to not be pulled out.

The pair of brackets 112 are adapted such that the respective flanges 112A thereof are brought into contact with the lower part of the rear side member 12 and the flanges 112A are each provided with a pair of through holes 113. A bolt 116 is inserted from a lower side into each of through holes 113 and threadedly engages with a weld nut 118 fixed to the rear side member 12.

Accordingly, this embodiment obtains the same effects as those of the first embodiment, and also can reduce the number of vehicle parts in comparison with the fifth embodiment.

Meanwhile, in each of the aforementioned embodiments, the suspension member can be supported on the side member by the rubber bushings interposed between the inner cylinder portion of the body mount and the outer cylinder portion thereof so as to be rotatable about an axis parallel to the longitudinal direction of the vehicle body. However, instead of this construction, the connecting portion of the suspension member and the side members is provided with a bearing, a ball joint, or the like, which can rotate about the axis parallel to the longitudinal direction of the vehicle body, so that the suspension member may be supported rotatable with respect to the side member. In addition, in the foregoing, a description of the rear underbody structure was given. However, the present invention may be applied to the case off a front underbody structure as well.

What is claimed is:

1. An underbody structure comprising a rear floor side member, a shaft member having one axis parallel to a longitudinal direction of a vehicle body mounted to said rear floor side member, a suspension member collar rotatably mounted to said shaft member, and a suspension member attached to said suspension member collar.

2. An underbody structure according to claim 1, wherein a mount having a uniform spring constant in a circumferential direction of said shaft member is disposed at a mounting portion of said shaft member.

3. An underbody structure according to claim 2, wherein said mount is formed into a cylindrical shape, with an axial center thereof being oriented toward a longitudinal direction of the vehicle body.

4. An underbody structure according to claim 2, wherein said mount comprises an outer cylinder portion, an inner cylinder portion, and a cushion rubber disposed between said outer cylinder portion and said inner cylinder portion.

5. An underbody structure according to claim 4, wherein a collar portion having a through hole formed therein is formed at said outer cylinder portion of said mount, a bolt is inserted into said through hole, and said mount is mounted to said rear floor side member by the bolt.

6. An underbody structure according to claim 4, further comprising:
a lower arm mounted to an intermediate portion of said suspension member; and wherein
said suspension member collar is cylindrical and an intermediate portion thereof is welded to an end portion of said suspension member in the transverse direction of the vehicle body and whose longitudinal direction is disposed along the longitudinal direction of the vehicle body, said suspension member collar is adapted such that the diameters of both longitudinal-direction end portions thereof are smaller than the intermediate portion of said suspension member collar and further adapted to be disposed between respective inner cylinder portions of a pair of said mounts so as to be coaxial with said inner cylinder portions, and said shaft member passes through said inner cylinder portion and said suspension member collar.

7. An underbody structure according to claim 2, wherein a shaft member is fixed to respective openings of both ends of said suspension member collar such that respective threaded portions are oriented toward outer sides in an axial direction of said suspension member collar, and wherein said mount is fixed to the shaft member.

8. An underbody structure according to claim 2, wherein said suspension member comprises an upper suspension member and an under suspension member so as to form an enclosed cross-sectional configuration of a rectangular shape, said upper suspension member having a hat-shaped cross-sectional configuration when seen from the transverse direction of the vehicle body, and having an opening thereof oriented downward, and said under suspension member having a hat-shaped cross-sectional configuration when seen from the transverse direction of the vehicle body, and having an opening thereof oriented upward, and further wherein, at an outer end portion of said suspension member in the transverse direction of the vehicle body, an intermediate portion of said suspension member collar and an outer peripheral portion of said suspension member collar are fixed in a position on the same plane as the upper wall surface at the outer end portion of said suspension member in the transverse direction of the vehicle body.

9. An underbody structure according to claim 2, wherein said suspension member forms an enclosed cross-sectional configuration by an upper suspension member and an under suspension member, said upper suspension member having a hat-shaped cross-sectional configuration when seen from the transverse direction of the vehicle body, and having an opening thereof oriented downward, and said under suspension member having a hat-shaped cross-sectional configuration when seen from the transverse direction of the vehicle body, with an opening thereof being oriented upward, and wherein an outer peripheral portion of said suspension member collar with an axis thereof being oriented toward the longitudinal direction of the vehicle body is fixed to an end portion at an outer side in the transverse direction of the vehicle body, of said suspension member.

10. An underbody structure according to claim 2, wherein said suspension member comprises an upper suspension member which has a hat-shaped cross-sectional configuration when seen from the transverse direction of the vehicle body, with an opening thereof being oriented downward, and an under suspension member which has a hat-shaped cross-sectional configuration when seen from the transverse direction of the vehicle body, with an opening thereof being oriented upward, and wherein an end portion in the transverse direction of the vehicle body of said suspension member is blocked by a wall portion and an intermediate portion of said suspension member collar passes through and is fixed to a proximal outer end, in the transverse direction of the vehicle body, of said suspension member.

11. An underbody structure according to claim 2, wherein said mount is inserted into said suspension member collar, and said shaft member is inserted in an axial position of said mount.

12. An underbody structure according to claim 2, wherein said suspension member forms an enclosed cross-sectional configuration by an upper suspension member and an under suspension member, said upper suspension member having a hat-shaped cross-sectional configuration when seen from the transverse direction of the vehicle body, and having an opening thereof oriented downward, and said under suspension member having a hat-shaped cross-sectional configuration when seen from the transverse direction of the vehicle body, and having an opening thereof oriented upward, and wherein an outer peripheral portion of a suspension member collar with an axis thereof being oriented toward the longitudinal direction of the vehicle body is fixed to an open end portion of said suspension member at an outer side in the transverse direction of the vehicle body.

13. An underbody structure according to claim 1, wherein said suspension member is formed into a cylindrical shape and elongated in a transverse direction of the vehicle body.

14. An underbody structure according to claim 1, further comprising:

an enclosed cross-sectional portion formed by closing the opening of said rear floor side member and extending in the longitudinal direction of the vehicle body;

an upper reinforcement of said rear floor side member, which is disposed at an upper portion of said enclosed cross-sectional portion and extends along said enclosed cross-sectional portion in the longitudinal direction of the vehicle body;

a lower reinforcement of said rear floor side member, which is disposed at a lower portion of said enclosed cross-sectional portion and extends along a bottom wall portion of said rear floor side member in the longitudinal direction of the vehicle body;

a weld nut welded to said upper reinforcement and said lower reinforcement so as to penetrate through holes which are coaxially formed in said rear floor side member, said upper reinforcement of said rear floor side member and said lower reinforcement of said rear floor side member, respectively; and an extended portion disposed at each of both end portions of said mount in the longitudinal direction of the vehicle body and extending toward an inner side in the transverse direction of the vehicle body, wherein said rear floor side member includes a substantially U-shaped cross-sectional configuration when seen from the longitudinal direction of the vehicle body, with an opening thereof being oriented upward.

15. An underbody structure according to claim 1, wherein said suspension member collar passes through holes which are respectively formed in side wall portions of said suspension member, and said suspension member collar is fixed to each of respective outside surfaces of the side wall portions so as to be coaxial with the through holes.

16. An underbody structure according to claim 1, wherein said suspension member collar comprises a small diameter portion disposed just under a cross member and connected directly to said suspension member, and a large diameter portion disposed at both axial-direction ends of the small diameter portion and being capable of rotating about said axis, a portion thereof is connected to said rear floor side member.

17. An underbody structure according to claim 16, wherein said suspension member forms an enclosed cross-sectional configuration by an upper suspension member and an under suspension member, said upper suspension member having a hat-shaped cross-sectional configuration when seen from the transverse direction of the vehicle body, and having an opening thereof oriented downward, and said under suspension member having a hat-shaped cross-sectional configuration when seen from the transverse direction of the vehicle body, and having an opening thereof oriented upward, and wherein an outer peripheral portion of said suspension member collar with an axis thereof being oriented toward the longitudinal direction of the vehicle body is fixed to an end portion, at an outer side in the transverse direction of the vehicle body, of said suspension member.

* * * * *